United States Patent
Ibsen et al.

(10) Patent No.: US 9,273,787 B2
(45) Date of Patent: Mar. 1, 2016

(54) CONTROL VALVE

(71) Applicant: FlowCon International ApS, Slagelse (DK)

(72) Inventors: Bjarne Wittendorff Ibsen, Dubai (AE); Carsten Enøe Møller, Slagelse (DK); Gitte Pedersen, Odense (DK); Mille Sveje Bøjgaard, København (DK)

(73) Assignee: Flowcon International ApS, Slagelse (DK)

( * ) Notice: Subject to any disclaimer, the term of this patent is extended or adjusted under 35 U.S.C. 154(b) by 0 days.

(21) Appl. No.: 14/591,186

(22) Filed: Jan. 7, 2015

(65) Prior Publication Data
US 2015/0198258 A1   Jul. 16, 2015

(30) Foreign Application Priority Data

Jan. 10, 2014 (DK) .................................. 2014 00012

(51) Int. Cl.
| | |
|---|---|
| *F16K 15/18* | (2006.01) |
| *F16K 37/00* | (2006.01) |
| *F16K 3/24* | (2006.01) |
| *F16K 3/26* | (2006.01) |
| *F16K 3/32* | (2006.01) |
| *F24D 19/10* | (2006.01) |
| *G05D 7/01* | (2006.01) |

(52) U.S. Cl.
CPC . *F16K 15/18* (2013.01); *F16K 3/24* (2013.01); *F16K 3/26* (2013.01); *F16K 3/32* (2013.01); *F16K 37/0016* (2013.01); *F24D 19/1015* (2013.01); *G05D 7/0113* (2013.01); *Y10T 137/8309* (2015.04); *Y10T 137/88054* (2015.04)

(58) Field of Classification Search
CPC ............. F16K 15/18; F16K 3/24; F16K 3/26; F16K 3/32; F16K 37/0016; F24D 19/1015; G05D 7/0113
See application file for complete search history.

(56) References Cited

U.S. PATENT DOCUMENTS

| | | | |
|---|---|---|---|
| 4,702,279 A | 10/1987 | Giese | |
| 2007/0262279 A1* | 11/2007 | Marstorp et al. | ............... 251/118 |
| 2008/0245428 A1* | 10/2008 | Jorgensen | .................. 137/627.5 |
| 2011/0068284 A1* | 3/2011 | Jorgensen | ........................ 251/46 |
| 2011/0186147 A1* | 8/2011 | Rasmussen | .............. 137/315.04 |
| 2013/0261813 A1* | 10/2013 | Ibsen et al. | .................... 700/282 |

FOREIGN PATENT DOCUMENTS

| | | |
|---|---|---|
| WO | WO2008052553 | 5/2008 |
| WO | WO2011130341 | 10/2011 |
| WO | WO2013007633 | 1/2013 |

* cited by examiner

*Primary Examiner* — Craig Schneider
*Assistant Examiner* — Kevin Barss
(74) *Attorney, Agent, or Firm* — K. David Crockett, Esq.; Nlky Economy Syrengelas, Esq.; Crockett & Crockett, PC

(57) ABSTRACT

A control valve for controlling liquid flow in a heating and/or cooling installation under command from an actuator within a range defined by a manually preset maximum. The control valve includes differential pressure regulating facilities and flow area regulating facilities. The control valve is provided with means for manually presetting a maximum flow through area and with means for automatically adjusting the flow area through area within the preset maximum.

11 Claims, 5 Drawing Sheets

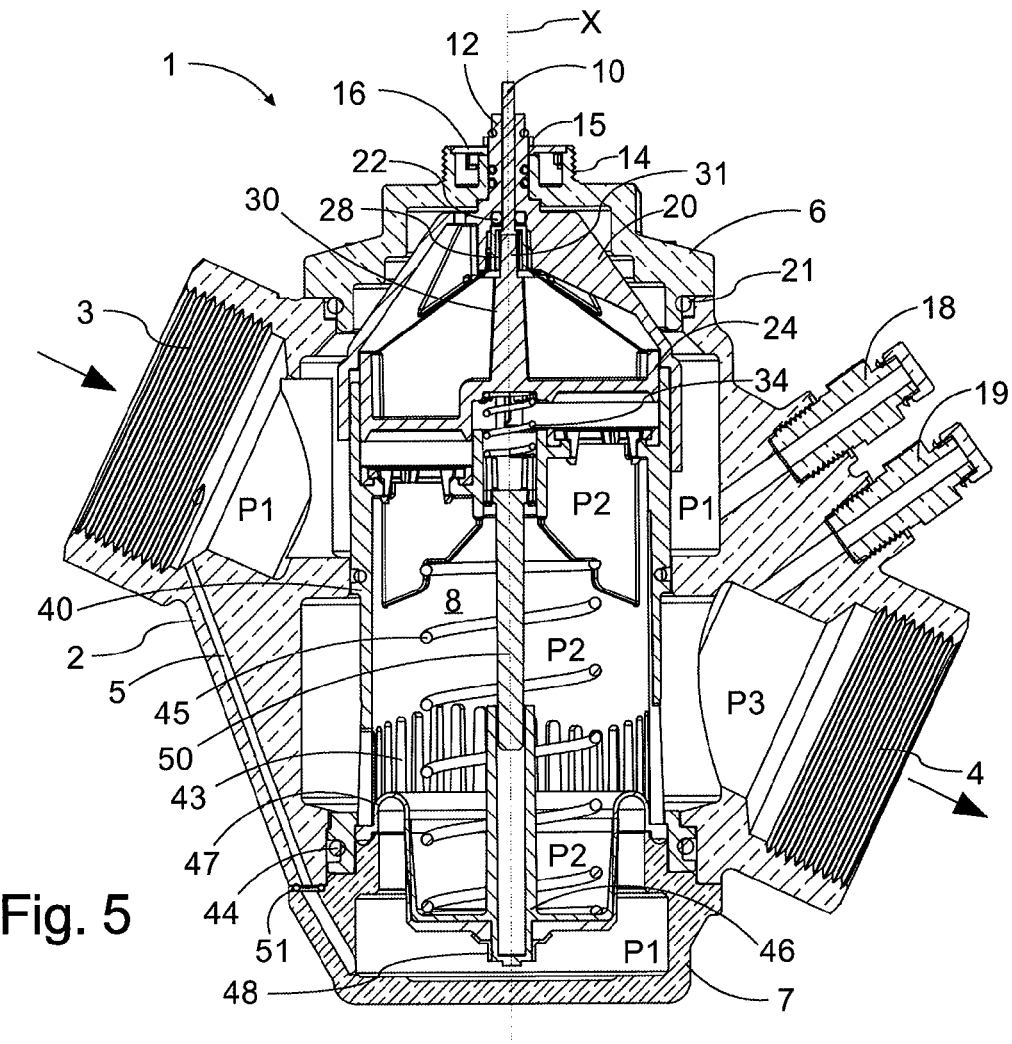
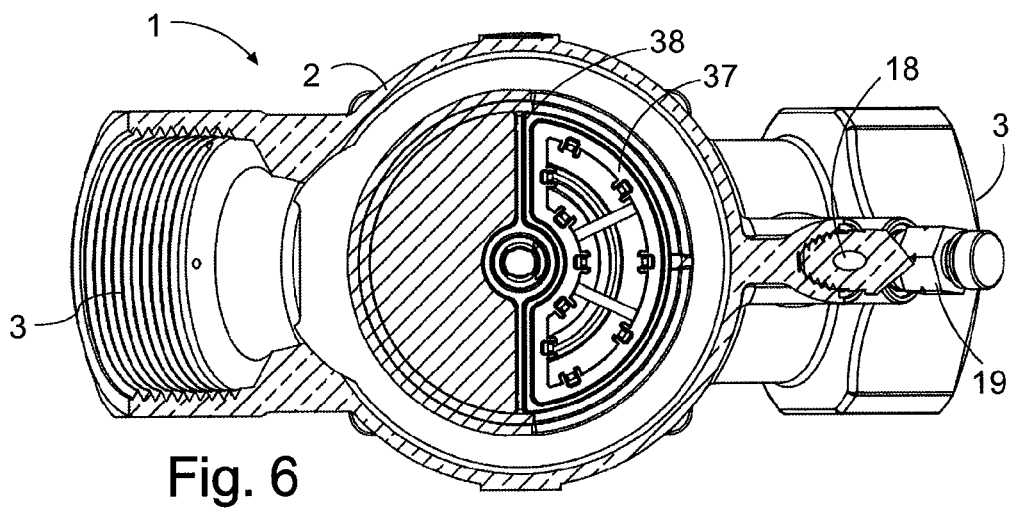

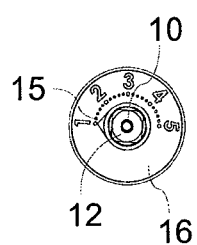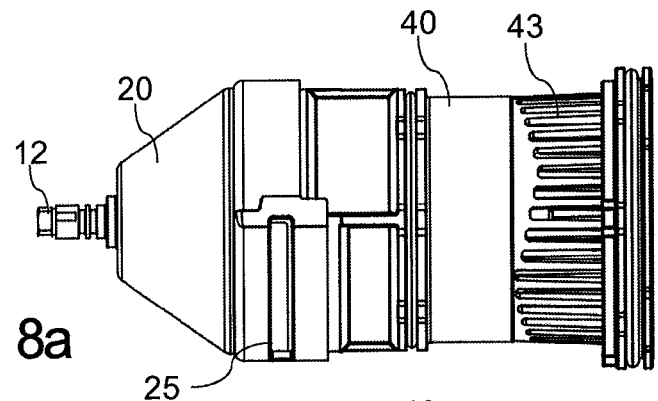
Fig. 8a
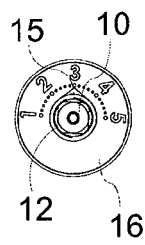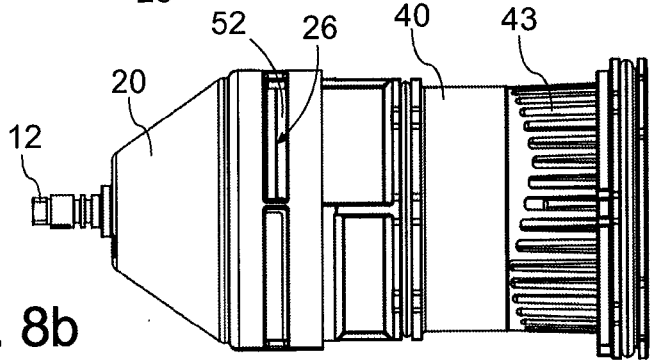
Fig. 8b
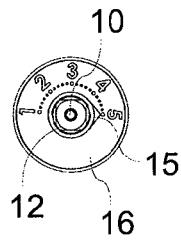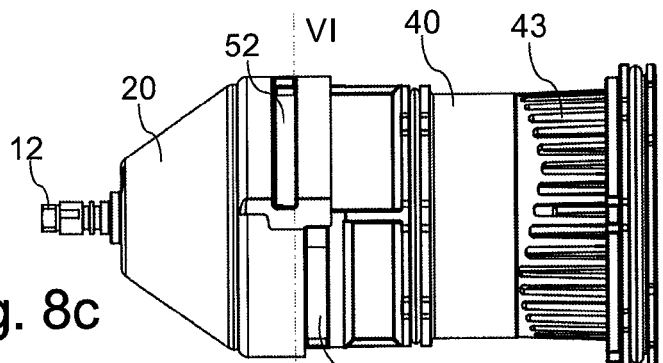
Fig. 8c
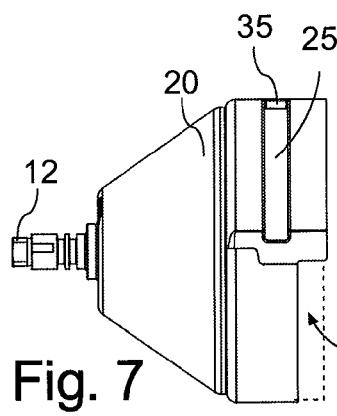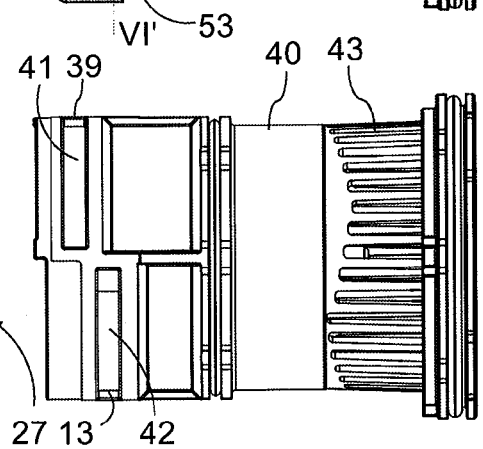
Fig. 7

CONTROL VALVE

CROSS-REFERENCE TO RELATED APPLICATIONS

This application claims the benefit of priority of Danish patent application No. PA2014 00012 filed on Jan. 10, 2014, the contents of which are incorporated herein by reference for all purposes.

TECHNICAL FIELD

The present inventions relate to a control valve for controlling liquid flow in a heating and/or cooling installation, in particular a control valve for controlling liquid flow under command from an actuator within a range defined by a manually preset maximum.

BACKGROUND ART

WO 2013/007633 discloses a control valve for controlling liquid flow in a heating and/or cooling installation under command from an actuator. The control valve comprises a flow regulator with two annular valve members that have an axial overlap. The one valve member is manually rotatable relative to the second valve member. The axially overlapping portions of the valve members define an inlet opening with a variable circumferential extent. A third valve member is axially displaceable by the actuator relative to the inlet opening and defines a control edge associated with the inlet opening. Rotation of the first valve member relative to the second valve member changes the circumferential extent of the opening, in order to manually preset a maximum through-flow area. Axial displacement of the third valve member changes the axial extent of the through-flow area of the inlet opening, in order to regulate the through-flow area within a range limited by the preset maximum. A differential pressure regulator is provided downstream of the flow regulator, and it regulates the differential pressure across the inlet opening.

The control valve disclosed in WO 2013/007633 has the advantage that it allows for an independent valve member to control the circumferential extent and for another independent valve member to control the axial extent of the effective through-flow area of the flow regulator. Thus the axial movement (the stroke) of the valve remains the same independent of the circumferential extent of the effective through-flow area. The control valve automatically adjusts itself to any flow area if it be adjusted manually or by actuator, axially or circumferential. When the operator presets the valve according to a maximum design flow, the stroke of the control valve remains the same.

However, the control valve disclosed in WO 2013/007633 has the disadvantage that the circumferential extent of the inlet opening is constructionally limited to 180° and axial extent of the effective flow area is limited by the maximum stroke length of the type of actuators that is used for controlling liquid flow in a heating and/or cooling installation.

SUMMARY

It is an object to overcome or at least reduce the problems and/or drawback associated with the prior art control valves.

This object is achieved by providing a control valve for controlling liquid flow in a heating and/or cooling installation under command from an actuator, the control valve comprises a valve housing with an inlet and an outlet having an annular or penannular portion with a certain axial extent, a second valve member having an annular or penannular portion with a certain axial extent, the annular or penannular portion of the first valve member having an axial overlap with the annular or penannular portion of the second valve member being manually rotatable relative to the second valve member and of the second valve member defining a first inlet opening with a variable circumferential extent in fluid communication with the inlet and defining a second inlet opening with a variable circumferential extent in fluid communication with the inlet with an annular, penannular or cylindrical portion with a certain axial extent, the third valve member being axially displaceable, preferably by the actuator, relative to the first and second inlet openings, the third valve member defining a first control edge associated with the first inlet opening and a second control edge associated with the second inlet opening, the third valve member comprising a reduced axial extent annular portion that defines the first control edge and a non-reduced axial extent semi-annular portion that defines the second control edge, whereby rotation of the first valve member relative to the second valve member simultaneously changes the circumferential extent of the first and second inlet openings for manually presetting a maximum through-flow area of the first and second inlet openings, whereby axial displacement of the third valve member changes the axial extent of the through-flow area of the first inlet opening and of the second inlet opening for regulating the through-flow area of the first and second inlet openings within a range limited by the preset maximum, and a differential pressure regulator downstream of the flow regulator with an outlet of the differential pressure regulator being in fluid connection with the outlet.

By providing two axially inlet openings with a variable circumferential extent the range in which the flow area of the valve can be controlled is approximately doubled. This increases the operational range of the control valve.

In an embodiment the first inlet opening and the second inlet opening are axially offset over a distance that ensures that there is no axial overlap between the first inlet opening and the second inlet opening.

In an embodiment the sum of the maximum circumferential extent of the first inlet opening and the maximum circumferential extent of the second inlet opening exceeds 180° or a half circle.

In an embodiment the second valve member defines in its annular portion a first through-flow opening and second through-flow opening axially offset from the first through-flow opening.

In an embodiment the first valve member defines in its annular portion a first through-flow opening and a second through-flow opening or recess axially offset from the first through-flow opening.

In an embodiment the first through-flow opening in the first valve member and the first through-flow opening in the second valve member are substantially completely overlapping in their axial extent.

In an embodiment the second through-flow opening or recess in the first valve member and the second through-flow opening in the second valve member substantially completely overlap in their axial extent.

In an embodiment the third valve member comprises a reduced axial extent annular portion that defines the first control edge and a non-reduced axial extent semi-annular portion that defines the second control edge.

In an embodiment the first valve member is operably connected to an axial valve stem so that rotation of the valve stem results in rotation of the first valve member and the valve stem has a marker secured thereto, the marker being configured to indicate the position of the first valve member on a fixed angular scale that is provided on the axial end of the housing where the valve stem protrudes from.

In an embodiment the first valve member and the second valve member are axially fixed relative to one another.

In an embodiment the second valve member is at least with its axially overlapping portion disposed inside the first valve member.

In an embodiment the head nut or the end cap can be combined with the housing in a single part.

In an embodiment the seals and seal securing parts are combined with the second valve member in a single part comprising made of two different materials using technology such as multi-component molding.

In an embodiment the first valve member and the valve stem is a single part, in another it is two separate parts.

Further objects, features, advantages and properties of the control valve according to the disclosure will become apparent from the detailed description.

BRIEF DESCRIPTION OF THE DRAWINGS

In the following detailed portion of the description, the invention will be explained in more detail with reference to the exemplary embodiments shown in the drawings, in which:

FIG. 5 is a sectional view of the control valve of FIG. 1, FIG. 6 is a cross-sectional view of the control valve of FIG. 1, FIG. 7 is an exploded view of an example embodiment of the first, second and third valve members of the valve of FIG. 1, FIG. 8a is a side view of the valve members of FIG. 7 in assembled form in a first position with a rotatable valve member in a fully closed position and illustrated together with a fixed angular scale and rotatable indicator, FIG. 8b, is the same view as FIG. 8a, with the rotatable valve member in a halfway closed position and the axially displaceable valve member also in a halfway closed position and illustrated together with the fixed angular scale and rotatable indicator, FIG. 8c, is the same view as FIG. 8a, with the rotatable valve member in a fully open position and the axially displaceable valve member also in a fully open position and illustrated together with the fixed angular scale and rotatable indicator.

DETAILED DESCRIPTION OF PREFERRED EMBODIMENTS

Figure 1:
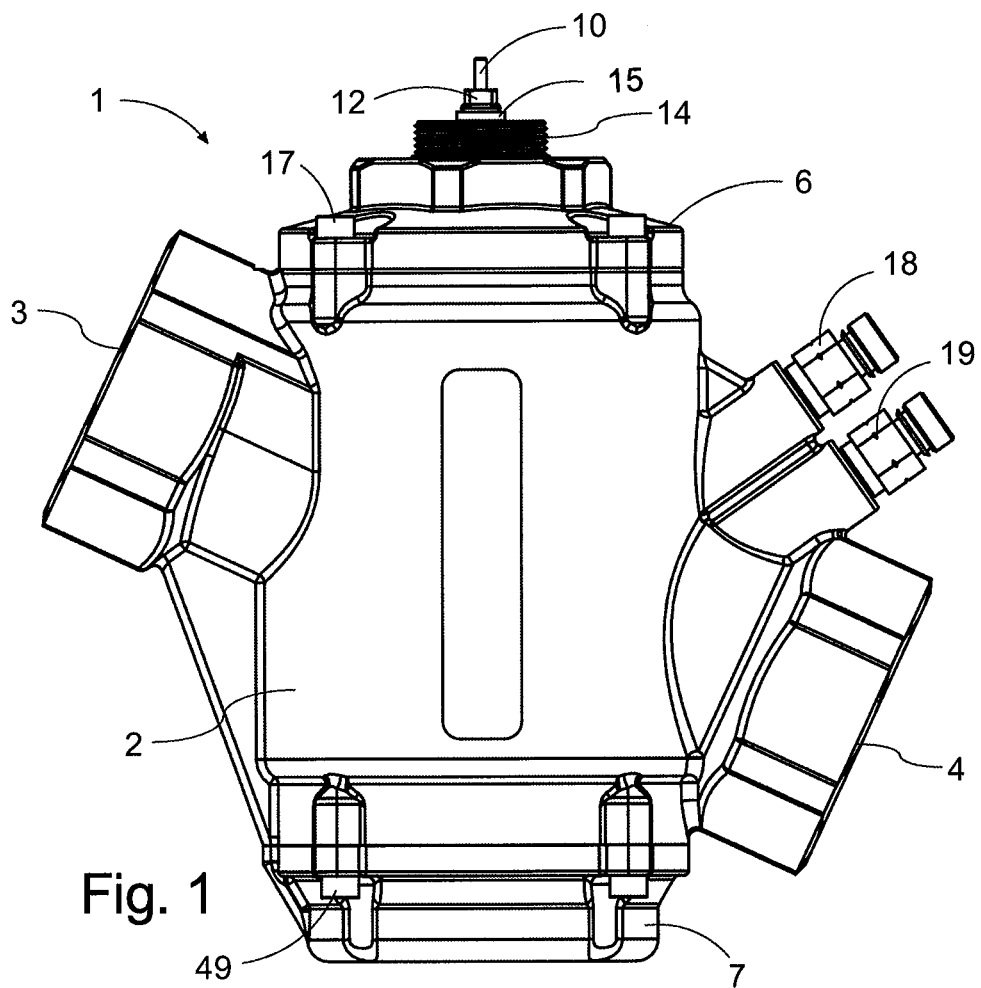
FIG. 1, is a side view of a control valve according to an example embodiment.

Example embodiments of the invention will now be described with reference to the drawing figures, in which like reference numerals refer to like parts throughout.

The control valve 1 is in an example embodiment a regulator valve that includes differential pressure regulating facilities and flow area regulating facilities. Preferably the control valve is provided with means for manually presetting a maximum flow through area and with means for automatically adjusting the flow through area within the preset maximum. The flow regulation is tightly connected with the differential pressure regulation. Thus, the actual regulation in the parts referred to as the flow regulation facilities or the flow regulator is "only" a regulation of the size of the through-flow area. The combination of the carefully controlled through-flow area and the differential pressure across it, results in the actual flow regulation.

Figure 2:
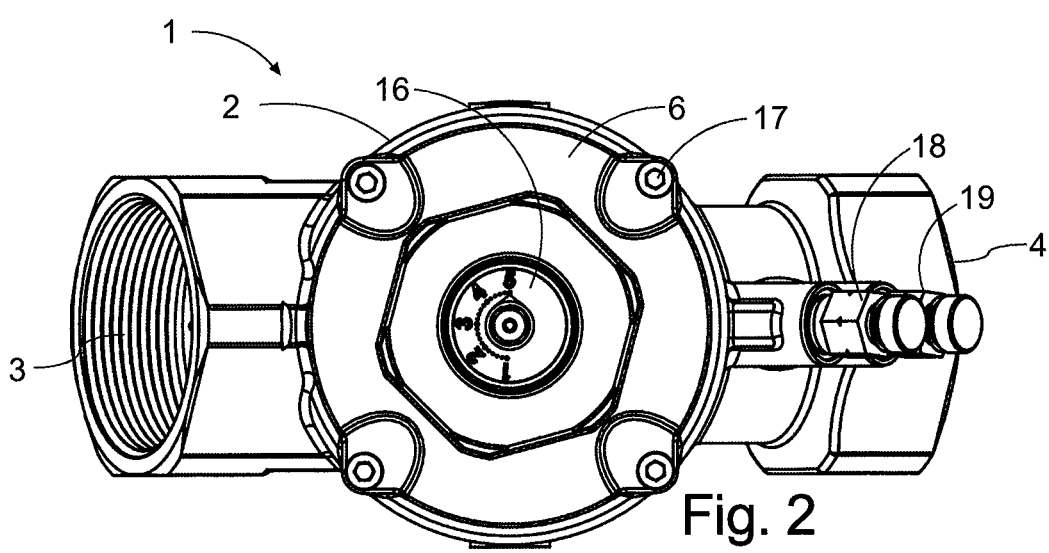
FIG. 2 is a top view of the control valve of FIG. 1.
Figure 3A:
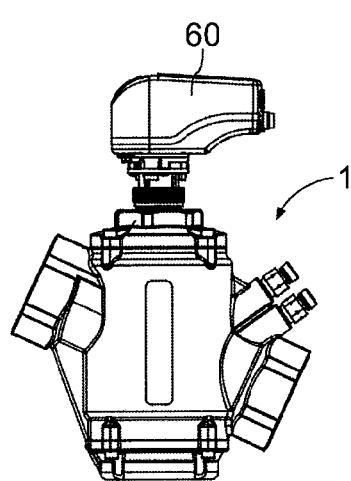
FIG. 3a is a side view of the control valve of FIG. 1 with an electronic actuator fitted thereto.
Figure 3B:
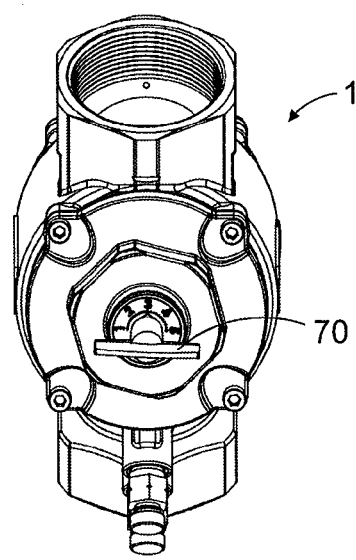
FIG. 3b is a view of the control valve of FIG. 1 with a key fitted thereto.
Figure 4:
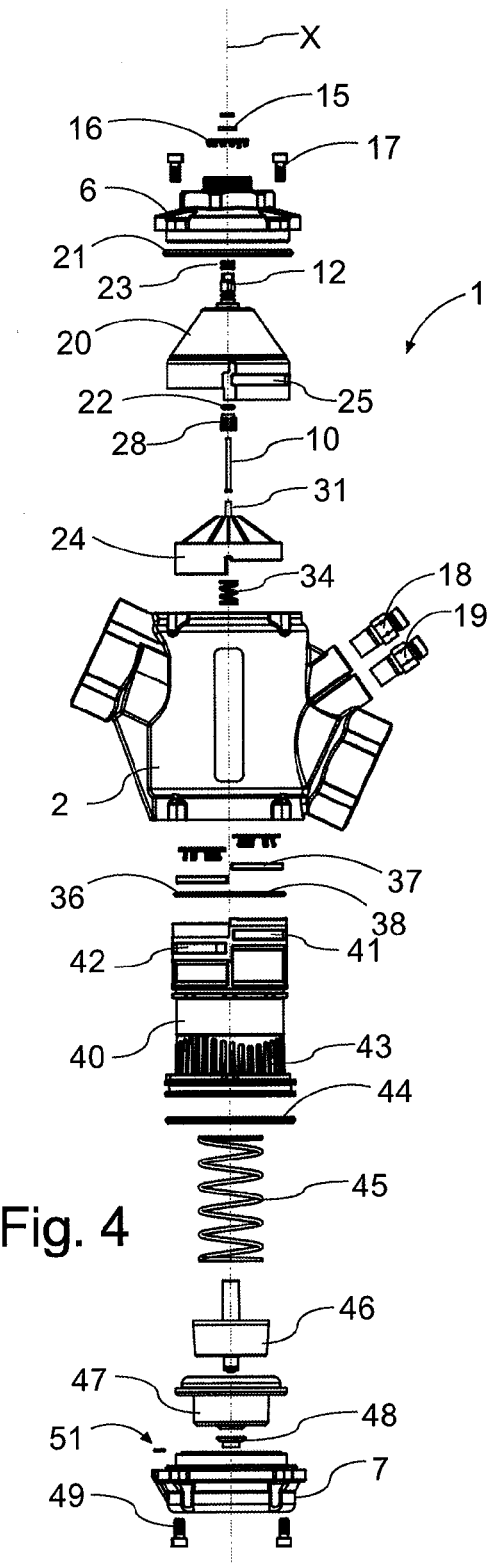
FIG. 4 is an exploded view of the control valve of FIG. 1.
Figure 9:
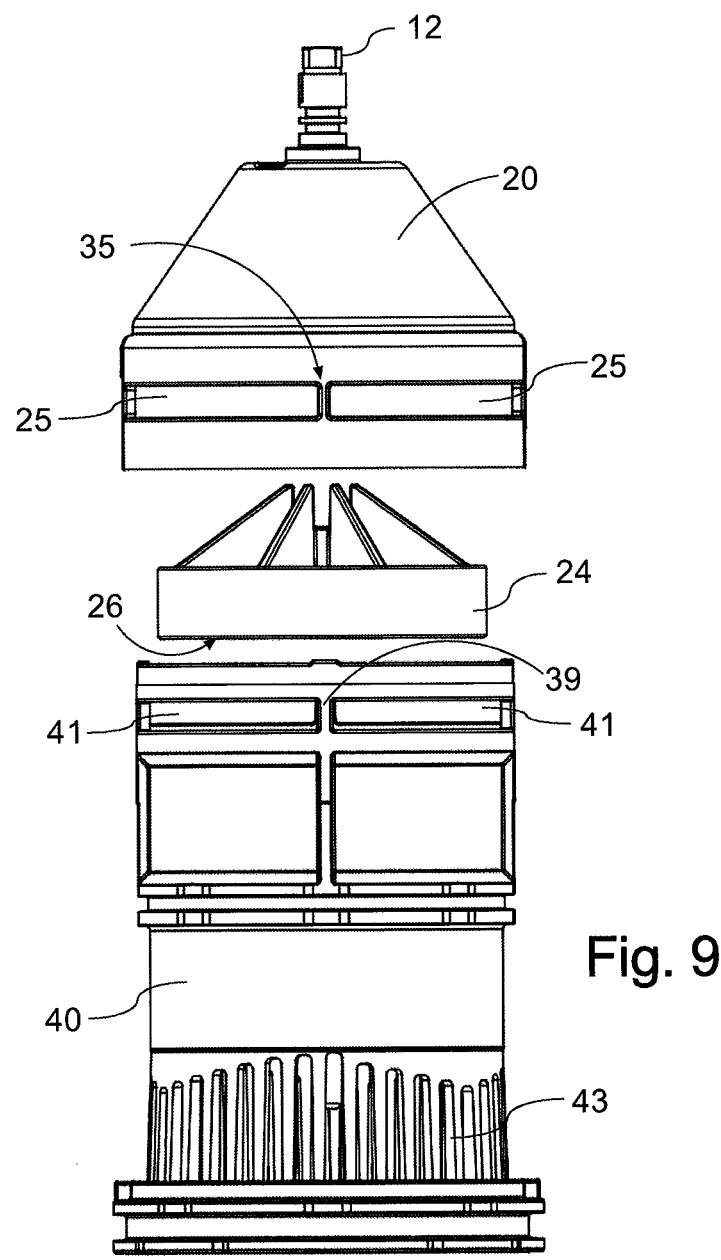
FIG. 9 is an exploded view of the valve members of another example embodiment of the control valve shown in FIG. 1.

FIGS. 1 to 7 and 8a-8c illustrate an example embodiment of a control valve 1 for use in a heating or cooling plant. In this embodiment the control valve 1 has a valve housing 2. The valve housing 2 is in an embodiment made from a suitable metal alloy, such as e.g. bronze (including gunmetal), brass (including corrosion-resistant and dezincification resistant brass, DZR or DR), ductile iron or steel (including stainless steel) and can be manufactured by a suitable molding technique such as hot pressing, die casting or forging. The valve housing 2 is provided with an inlet 3 and an outlet 4. The liquid flows into the inlet 3 and out from the outlet 4 as indicated by the arrows in FIG. 5. Both the inlet 3 and outlet 4 are provided with internal or external (not shown) threads or other connection facilities, such as press end connections, for connection to pipes of a heating or cooling plant.

The valve housing 2 is a hollow and essentially cylindrical body with open axial ends and with the inlet 3 and outlet 4 on opposite sides of the cylindrical body and opening to the interior 8 of the hollow in the valve housing. The axial ends of the valve housing 2 are closed by a head nut 6 that is fitted to the upper (upper as in the orientation depicted in FIG. 1) axial end and an end cap 7 secured to the opposite axial end. Both the head nut 6 and the end cap 7 are secured to the housing (including possible fastening features such as locking screws 17,49 or that the inside of the housing and the outside of respectively the head nut 6 and the end cap 7 is threaded). An O-ring 21 seals the head nut 6 to the valve housing 2 and an O-ring 51 seals the end cap 7 to the valve housing 2 and a bulge on the diaphragm seals the end cap 7 to the second valve member 40, which is sealed to the housing by O-ring 44.

The valve housing 2 can be provided with P/T plugs 18,19 for pressure and/or temperature sensors of the like or for de-aeration equipment.

The head-nut 6 is provided with a fastening feature (including options of a threaded collar 14 or a snap fit locking mechanism (not shown)) that allows an actuator 60 (shown in FIG. 3) to be attached to the top of the control valve 1. The actuator 60 is preferably a thermal or electrical actuator.

A rotatable valve stem 12 protrudes from the inner parts of the valve. The rotatable valve stem 12 can be rotated about the central axis X of the control valve 1. In an embodiment the valve stem 12 is an integral part of the first valve member 20 and in an embodiment the valve stem 12 and the first valve member 20 are part of a single molded item.

A marker 15 is secured to the rotatable valve stem 12 and rotates in unison therewith. The valve is provided with a fixed angular scale 16 to indicate the angular position of the marker 15 and thereby of the valve stem 12 and the second valve member 20.

An axially displaceable pin 10 is received concentrically in an axial bore in the valve stem 12. The actuator 60 acts on the pin 10.

FIGS. 4 to 7 and 8a-8c show the internal components of the control valve 1 in greater detail. A valve insert comprises the first valve member 20, a second valve member 40 and a third valve member 24 is inserted into the hollow interior 8 of the valve housing 2. In an embodiment the valve members 20,24, 40 are made from a mainly plastic material (polymer material). In an embodiment the first valve member 20 is arranged to be rotatable relative to the second valve member 40 and the housing 2. In an embodiment the second valve member 40 is stationary relative to the housing 2. The first valve member 20 has an essentially frustoconical shaped portion and an essentially annular shaped portion. The valve stem 12 is operatively connected to the frustoconical shaped portion so that the first valve member 20 rotates in unison with the valve stem 12. The annular portion of the first valve member 20 has a certain axial extent and this portion is provided with a preferably oblong through-flow opening 25 with a circumferential extent larger than its axial extent.

O-rings 23 seal valve stem 12 to the head nut 6. The top of the frustoconical portion of the first valve member 20 abuts with the inner side of the head nut 6. The pin 10 extends through the stem 12 into the upper (upper as in FIGS. 4/5) part of the first valve member 20. An O-ring 22 seals the pin 10 to the upper part of the first valve member 20. The lower (lower as in FIG. 4) extremity of the pin 10 engages the upper extremity of a pin 31 projecting upwardly (upwardly as in FIG. 4) from the third (axially displaceable) valve member 24. A preferably plastic material (polymer) locking part 28 is received in a recess in the rotatable first valve member 20. The locking part 28 has a through-going bore with an upper opening slightly less in diameter than the rest of the through going bore. The lower extremity of the pin 10 is received in the through going bore and is provided with a flange that prevents the lower extremity of the pin 10 to leave the throughgoing bore.

The upwardly projecting pin 31 of the third valve member 24 is received in the through going bore in the locking part 28 with the upper extremity of the pin 31 engaging the flange provided at the lower extremity of the pin 10.

The third valve member 24 is received axially displaceable inside the upper portion of the hollow second valve member 40. The second valve 40 member has an essentially annular body, i.e. like a hollow cylinder. The upper portion of the valve member 40 is received inside the annular portion of the first valve member 20. Thus, an annular portion of the second valve member 40 has an axial overlap with the annular portion of the first valve member 20. The overlapping portions of the first and second valve members 20, 40 can be penannular (forming an almost complete ring) instead of annular.

A helical wire spring 34 is disposed between the third valve member 24 and the second valve member 40. Hereto, the second valve member 40 is provided with a recess at its upper end in which a portion of the helical spring is received. The helical wire spring 34 urges the third valve member 24 upwards towards the pin 10 and the actuator 60.

An O-ring 36 seals the second valve member 40 to the inner wall of the valve housing 2 for dividing the valve housing 2 in an inlet part with a fluid pressure P1 corresponding to the pressure at the inlet 3 and an outlet part with a pressure P3 corresponding to the pressure at the outlet 4. A Pressure communication channel 5 communicates the pressure P1 at the inlet 3 to the bottom end of the valve housing 2.

Two seal securing parts 37 secure two seals 38 to the top of the second valve member 40 to enable a perfect seal between the second valve member 40 (and thus the housing 2) and the third valve member 24 controlled by the actuator 60. This enables the actuator 60 to close off the valve 1 completely, so that no leak can occur between the inlet 3 (P1) on one side and the middle part 8 (P2) and outlet 4 (P3) on the other side. In an embodiment P2 is the pressure downstream of the arrangement for adjusting the flow area and upstream of the arrangement for the differential pressure regulation.

An axially displaceable diaphragm guide 46 has a hollow upwardly projecting stem in which a downwardly projecting guiding shaft 50 of the second valve member 40 is received. The diaphragm guide 46 supports and guides a diaphragm 47 and the diaphragm 47 is secured to the diaphragm guide 46 by a snap ring 48. A helical wire spring 45 is disposed between the second valve member 40 and the diaphragm guide 46 to bias the diaphragm guide 46 in a downward direction as a countermeasure to the force respectively from P1, which influences the diaphragm 47 and diaphragm guide 46 in an upward direction and from P2, which influences the diaphragm 47 and diaphragm guide 46 in a downward direction. The second valve member 40 is provided with a plurality of exit openings 43 that are distributed around the circumference of the second valve member 40 at a height that approximately corresponds to the length of the diaphragm 47. Thus, the arrangement including the diaphragm 47 and the exit openings 43 maintains a constant differential pressure between the inlet pressure P1 and the intermediate pressure P2.

The diaphragm 47 closes the exit openings 43 to greater or lesser extent. The exit openings 43 are elongated openings with their greatest extent in the axial direction. A higher (higher as e.g. in FIGS. 4 and 5) position of the diaphragm 47 and diaphragm guide 46 results in a lesser extent of the elongated exit openings 43 being open and a lower position of the diaphragm 47 and diaphragm guide 46 results in a larger extent of the exit openings 43 being open.

The portion of the rotatable stem 12 that protrudes from the valve housing 2 is configured to be engaged by a detachable handle or key 70. Hereto, the upper portion of the valve stem 12 is provided with a noncircular cross-section, in an embodiment this is a squared cross-sectional shape that matches a key 70 with a recess with a squared cross-sectional shape.

FIGS. 7 and 8a-8c disclose the first valve member 20, second valve member 40 and the third valve member 24 in greater detail and explain their operation.

As shown in FIG. 7, the first rotatable valve member 20 is provided with an oblong first through-flow opening 25 in its annular or penannular part. The circumferential extent of the first through-flow opening 25 is in this example embodiment approximately 180° but could be lesser in other embodiments. A reinforcing rib 35 extends across the first through-flow opening 25 in order to reinforce and stabilize the first valve member 20. In the shown embodiment the reinforcing rib 35 is placed in the middle of the circumferential extent of the first through-flow opening 25, but it is understood that the reinforcing rib 35 does not have to be in the middle of the circumferential extent of the through-flow opening and it is understood that there can be more than one reinforcing ribs 35. Preferably, the reinforcing rib or ribs 35 extend axially across the through-flow opening 25, but it is understood that the reinforcing rib or ribs 35 can also extend across the first through-flow opening 25 at an angle to the axial direction. The reinforcing rib or ribs 35 have in an embodiment the same thickness in the radial direction as the wall thickness of the material around the first through-flow opening 25. The circumferential extent or width of the reinforcing rib or ribs 35 is significantly smaller than the circumferential extent of the first through-flow opening 25.

The first valve member 20 is further provided with a semi-annular recess 29 that is achieved by a reduced axial extent section of the annular portion. The semi-annular recess 29 has a circumferential extent of approximately 180° but could in other embodiments have a lesser circumferential extent. The semi-annular recess 29 is axially offset to the first through-flow opening 25 so that there is no axial overlap between the first through-flow opening 25 and the semi-annular recess 29.

The third axially displaceable valve member 24 can be provided with radial reinforcement ribs 33 that attach to a central shaft 30 and with a first semi-annular control edge 26 and a second semi-annular control edge 27 that is axially displaced relative to the first control edge 26 to a degree that corresponds to the axial offset between the first through-flow opening 25 and the recess 29. This is achieved by the axial extent of the annular or penannular portion of the third valve member 24 having a larger axial extent than the axial extent of a semi-annular portion of the third valve member 24.

The stationary second valve member 40 is provided with an oblong first through-flow opening 41 and oblong second through-flow opening 42 that is axially offset relative to the first through-flow opening 41 to a degree that corresponds to the axial offset between the first through-flow opening 25 and the recess 29.

The circumferential extent of the first through-flow opening 41 and of the second through-flow opening 42 is in this example embodiment almost 180° but could be lesser in other embodiments. The first through-flow opening 41 is provided with a reinforcing rib 39 and the second through-opening 42 is provided with a reinforcing rib 13. In the shown embodiment the reinforcing rib 13,39 is placed in the middle of the circumferential extent of the first or second through-flow opening 42,41, but it is understood that the reinforcing rib 13,39 does not have to be in the middle of the circumferential extent of the through-flow opening and it is understood that there can be more than one reinforcing ribs 13,39. Preferably, the reinforcing rib or ribs 13,39 extend axially across the through-flow opening 42,41, but it is understood that the reinforcing rib or ribs 13,39 can also extend across the first through-flow opening 42,41 at an angle to the axial direction. The reinforcing rib or ribs 13,39 have in an embodiment the same thickness in the radial direction as the wall thickness of the material around the first through-flow opening 42,41. The circumferential extent or width of the reinforcing rib or ribs 13,39 is significantly smaller than the circumferential extent of the first through-flow opening 42,41.

The first through-flow opening 25 in the first valve member 20 and the first through-flow opening 41 in the second valve member 40 overlap completely in the axial direction and have a preferably substantially identical axial extent. In an embodiment the extent of the openings in the (rotatable) first valve member 20 is slightly larger in the axial direction than the corresponding extent of the openings of the second valve member 40 to adjust for a possible slightly imperfect axial alignment, e.g. caused by tolerances. The same applies to the recess 29 in the first valve member 20 and the second through-flow opening 42 in the second valve member 40. The circumferential extent of the first through-flow opening 25 in the first valve member 20 is substantially identical to the circumferential extent of the first through-flow opening 41 in the second valve member. The circumferential extent of the recess 29 is identical to the circumferential extent of the second through-flow opening 42. In an embodiment the circumferential extent of the openings in the (rotatable) first valve member 20 is slightly larger than the corresponding extent of the openings of the second valve member 40 to allow the full effect of the opening area of the second valve member 40.

When the rotational position of the first valve member 20 relative to the second valve member 40 is as shown in FIG. 8a there is no overlap between the first through-flow opening 25 in the first valve member 20 and the first through-flow opening 41 in the second valve member 40. In this rotational position of the first valve member 20 relative to the second valve member 40 there is no overlap between the recess 29 in the first valve member 20 and the second through-flow opening 42 in the second valve member 40 either. Thus, the control valve 1 is essentially closed for through-flow and this is indicated by the rotatable marker 15 indicating position "1" in the fixed angular scale 16.

When the rotational position of the first valve member 20 relative to the second valve member 40 is as shown in FIG. 8b there is an overlap between the first through-flow opening 25 in the first valve member 20 and the first through-flow opening 41 in the second valve member 40 that results in a first inlet opening 52 with a circumferential extent equal to half the circumferential extent of the first through-flow opening 25, i.e. approximately 90° In this rotational position of the first valve member 20 relative to the second valve member 40 there is an overlap between the recess 29 in the first valve member 20 and the second through-flow opening 42 in the second valve member 40 that results in a second inlet opening 53 with a circumferential extent equal to half the circumferential extent of the recess 29, i.e. approximately 90°.

In FIG. 8b it can also be seen that the third valve member 24 assumes a position where the first control edge 26 obscures approximately half of the axial extent of the first inlet opening 52 that is defined by the overlap between the first through flow opening 25 and the first through-flow opening 41. Simultaneously, the second control edge 27 obscures approximately half of the axial extent of the second inlet opening 53 that is defined by the overlap between the recess 29 and the second through-flow opening 42.

The axial position of the third valve member 24 is completely independent from the rotational position of the first valve member 20 and is in FIG. 8b positioned such that half of the inlet openings created by the first and second valve members 20, 40 is obstructed merely for illustration purposes and it is understood that the third valve member 24 could under command from the actuator 60 assume any axial position in the range between a position that does not at all obscure the inlet openings created by the first- and second valve member 20,40 and a position where the third valve member 24 completely obscures the inlets created by the first and second valve members 20,40 and furthermore reach the seals 38 in order to completely close off all flow.

Thus, the control valve 1 is half-closed for through-flow and this is indicated by the rotatable marker 15 indicating position "3" in the fixed angular scale 16, i.e. the maximum flow through the control valve 1 is determined by two inlet openings that each have assumed half of their maximum through-flow area.

When the rotational position of the first valve member 20 relative to the second valve member 40 is as shown in FIG. 8c there is a complete overlap between the first through-flow opening 25 in the first valve member 20 and the first through-flow opening 41 in the second valve member 40. This results a the first inlet opening 52 with a circumferential extent equal to the circumferential extent of the first through-flow opening 25, i.e. approximately 180°. In this rotational position of the first valve member 20 relative to the second valve member 40 there is a complete overlap between the recess 29 in the first valve member 20 and the second through-flow opening 42 in the second valve member 40. This results in a second inlet opening 53 with a circumferential extent equal to the circumferential extent of the recess 29, i.e. approximately 180°.

In FIG. 8c the third valve member 24 is for illustration purposes positioned such that it does not obscure the inlet openings created by the overlap between the through-flow openings in the first and second valve members 20,40, i.e. the first inlet opening 52 and the second inlet opening 53 have their maximum flow through area.

In this rotational position of the first valve member 20 the inlet openings formed by the overlap in the through-flow openings in the first and second valve members 20, 40 are preset to their maximum possible flow-through area. This is reflected by the rotatable marker 15 indicating position "5", i.e. the fully open position with the control valve 1 being set to its highest maximum flow range.

The valve 2 is in an embodiment a self-balancing dynamic flow control valve that is differential pressure independent, with an actuator 60 that is controlled by an input signal or by ambient temperature. The amount of liquid flowing through the control valve 1 is determined by an adjustable throttling element, which is in an embodiment formed as an adjustable orifice formed by the inlets created by the overlap between the first and second valve members 20,40.

The angular position of the rotatable first valve member 20 determines the maximum flow area of the adjustable orifice as formed by the two inlet openings. The position of the rotatable valve member 20 and thus of the valve stem 12 has to be set accurately so the operator knows exactly the maximum flow for the chosen setting.

The position of an axially displaceable shaft or pin 10 that is concentric with the valve stem 12 and protrudes from the valve stem 12 determines the axial flow area of the throttling element/adjustable orifice in the control valve 1 between a minimum value and the maximum set value determined by the position of the rotatable valve member 20.

The axially displaceable pin 10 is operably connected to the actuator 60 so that the position of the axially displaceable pin 10 and the third valve member can be controlled with a control signal to the actuator 60, or by ambient temperature.

The maximum flow area is manually set by an operator when the actuator 60 is dismounted from the control valve 1 and the valve stem 12 can be accessed. The shape and size of the valve stem 12 and the torque required to rotate the valve stem 12 is such that it is not possible for an operator to adjust the position of the rotatable valve member 20 without the use of a suitable tool. For this purpose a detachable handle or key 70 is provided. The detachable key 70 is detachably coupled to the valve stem 12 and the key 70 provides an operator with enough leverage to adjust the position of the rotatable valve member 20.

In operation, fluid, such as cold or warm water arrives at the inlet 3 with a pressure level P1. This water flows through the two inlet openings defined by the overlap between the through-flow openings 25,41,42 and recess 29 into the interior 8 of the control valve 1. The two inlet openings act as a restriction/orifice and therefore the pressure P2 in the interior 8 of the control valve 1 is lower than pressure P1. The pressure of the liquid in the interior 8 of the control valve urges the diaphragm 47 downwards, together with the helical wire spring 45. Pressure P1 is communicated via the pressure communication channel 5 to the opposite side of the diaphragm 47 and urges the diaphragm 47 upwards. The balance of these forces determines the position of the diaphragm 47 and thereby the differential pressure across the inlet openings/orifice. Since the diaphragm 47 and the exit openings 43 act as a restriction to the flow the pressure P3 in the outlet 4 is lower than pressure P2.

FIG. 10 shows the valve members of another example embodiment of the control valve 1 that is essentially identical to the control valve described above, except that the rotatable valve member 20 is provided with a single flow-through opening 25 that is provided with a reinforcing rib 35 and the second valve member 40 is provided with a single flow-through opening 41 that is provided with a reinforcing ribs 39. The axially displaceable third valve member 24 is provided with a single control edge 26. The circumferential extent of the single flow-through openings 25 and 41 is at the most 180°

The reinforcement rib 35 stabilizes and reinforces the first valve member 20 and the reinforcement rib 39 in the second valve member 40 against the considerable forces that are acting on the valve members during operation of the control valve 1 due to e.g. the pressure differences acting on these valve members. There can be more than one reinforcing rib 35, 39 for each of the flow-through openings 25, 41. The operation of the control valve 1 of this embodiment is essentially identical to the operation of the control valve 1 described above.

In the shown embodiments the angular range of the valve stem 12 and the rotatable valve member is approximately 180°. However, it is noted that the teaching of this invention can also be applied to valves that have a much lesser range of rotation for the rotatable valve adjustment member, such as approximately 90°. In an embodiment the total circumferential extent of the openings are larger than 360°, however this will prevent use with (relatively) small flows.

As such, those skilled in the art will appreciate that the conception upon which this invention is based may readily be utilized as a basis for the designing of other structures, methods and systems for carrying out the several purposes of the present invention. It is important, therefore, that the claims be regarded as including such equivalent constructions insofar as they do not depart from the scope of the present invention.

The term "comprising" as used in the claims does not exclude other elements or steps. The term "a" or "an" as used in the claims does not exclude a plurality.

The invention claimed is:

1. A control valve (1) for controlling liquid flow in a heating and/or cooling installation under command from an actuator, the control valve (1) comprises:
    a valve housing (2) with an inlet (3) and an outlet (4),
    a flow regulator comprising:
        a first valve member (20) having an annular or penannular portion with a certain axial extent,
        a second valve member (40) having an annular or penannular portion with a certain axial extent,
        the annular or penannular portion of the first valve member (20) having an axial overlap with the annular or penannular portion of the second valve member (40),
        the first valve member (20) being manually rotatable relative to the second valve member (40),
        the axially overlapping annular or penannular portions of the first valve member (20) and of the second valve member (40) defining a first inlet opening (52) with a variable circumferential extent in fluid communication with the inlet (3) and defining a second inlet opening (53) with a variable circumferential extent in fluid communication with the inlet (3),
        the first inlet opening (52) being axially offset relative to the second inlet opening (53),
        a third valve member (24) with an annular, penannular or cylindrical portion with a certain axial extent,
        the third valve member (24) being axially displaceable, preferably by the actuator, relative to the first and second inlet openings (52,53),
        the third valve member (24) defining a first control edge (26) associated with the first inlet opening (52) and a second control edge (27) associated with the second inlet opening (53), the third valve member (24) comprising a reduced axial extent annular portion that defines the first control edge (26) and a non-reduced axial extent semi-annular portion that defines the second control edge (27),
        whereby rotation of the first valve member (20) relative to the second valve member (40) simultaneously changes the circumferential extent of the first and second inlet openings (52,53) for manually presetting a maximum through-flow area of the first and second inlet openings (52,53), whereby axial displacement of the third valve member (24) changes the axial extent of the through-flow area of the first inlet opening (52) and of the second inlet opening (53) for regulating the through-flow area of the first and second inlet openings (52,53) within a range limited by the preset maximum, and a differential pressure regulator downstream of the flow regulator with an outlet of the differential pressure regulator being in fluid connection with the outlet (4).

2. A control valve (1) according to claim 1, wherein the first through-flow opening (25) in the first valve member (20) and the first through-flow opening (41) in the second valve member (40) are substantially completely overlapping in their axial extent.

3. A control valve (1) according to claim 1, wherein the second through-flow opening or recess (29) in the first valve member (20) and the second through-flow opening (42) in the second valve member (40) substantially completely overlap in their axial extent.

4. A control valve (1) according to claim 1, wherein the first inlet opening (52) and the second inlet opening (53) are axially offset over a distance that ensures that there is no axial overlap between the first inlet opening (52) and the second inlet opening (52).

5. A control valve (1) according to claim 1, wherein the sum of the maximum circumferential extent of the first inlet opening (52) and the maximum circumferential extent of the second inlet opening (53) exceeds 180° or a half circle.

6. A control valve (1) according to of claim 1, wherein the second valve member (40) defines in its annular portion a first through-flow opening (41) and second through-flow opening (42) axially offset from the first through-flow opening (41).

7. A control valve (1) according to any claim 1, wherein the first valve member (20) defines in its annular portion a first through-flow opening (25) and a second through-flow opening or recess (29), the second through-flow opening or recess (29) axially offset from the first through-flow opening (25).

8. A control valve (1) according to claim 1, wherein the third valve member (24) comprises a first control edge (26) and a second control edge (27).

9. A control valve (1) according to claim 1, wherein the first valve member (20) is operably connected to an axial valve stem (12) so that rotation of the valve stem (12) results in rotation of the first valve member (20) and the valve stem has a marker (15) secured thereto, the marker being configured to indicate the position of the first valve member (24) on a fixed angular scale (16) that is provided on the axial end of the housing (2).

10. A control valve (1) according to claim 1, wherein the first valve member (20) and the second valve member (40) are axially fixed relative to one another.

11. A control valve (1) according to claim 1, wherein the second valve (40) member is at least with its axially overlapping portion disposed inside the first valve member (20).

* * * * *